Aug. 21, 1945.                    C. THEILER                        2,383,089
        DEVICE FOR THE CONSTRUCTION OF TIGHT FLANGE
                    JOINTS IN LINED APPARATUS
                       Filed March 26, 1942
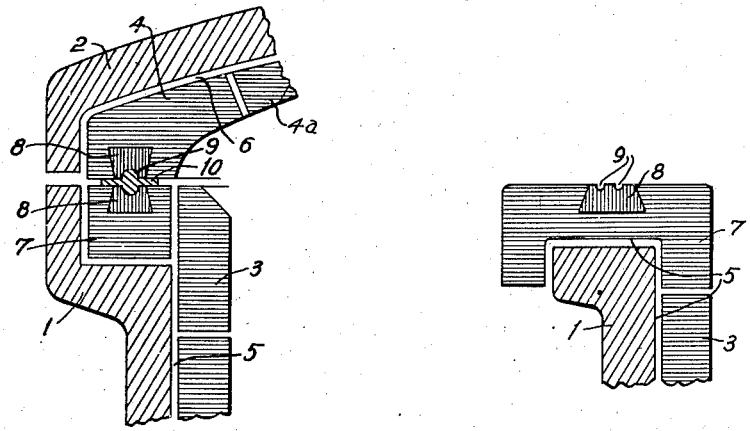
Fig.1.                                Fig.2.
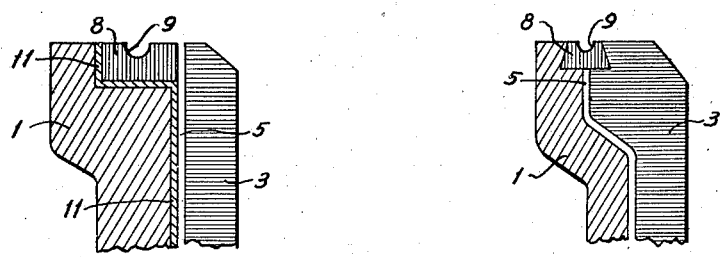
Fig.3.                                Fig.4.
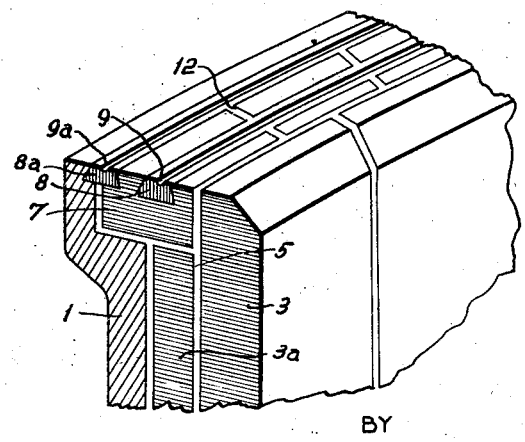
Fig.5.
INVENTOR
C. Theiler
BY
E. F. Wenderoth
ATTORNEY Patented Aug. 21, 1945

2,383,089

UNITED STATES PATENT OFFICE 2,383,089

DEVICE FOR THE CONSTRUCTION OF TIGHT FLANGE JOINTS IN LINED APPARATUS

Casimir Theiler, Basel, Switzerland, assignor to the firm of Society of Chemical Industry in, Basle, Basel, Switzerland Application March 26, 1942, Serial No. 436,375
In Switzerland January 16, 1941

4 Claims. (Cl. 138—63)

The reaction and storage vessels, pipe lines, and the like which are used in the chemical industry and which are lined with various acid- and alkaliproof materials laid in special cements, have been proved to very resistant towards chemical and thermal influences. The flange joints of such apparatus, such as that between vessel and lid or between one section of a pipe line and another, could only be constructed in a more or less improvised manner up to the present, use being made of metals which resisted corrosion to some extent, for example, iron flanges protected by means of lead. Methods of construction are also known in which the metal flange is protected by cementing on to it cover plates of the same material as the lining. In this way, the flange of the vessel is protected against chemical attack, but the sealing of the vessel to the outside is unsatisfactory, as the cover plates can never be laid absolutely evenly. Even if the surface of the joint be smoothed after these cover plates have been laid—which is something that can only be carried out on easily transportable vessels—a seal that will be satisfactory under working conditions cannot be guaranteed. This is to be explained by the fact that no jointing cement can be found which has the same properties of strength and, particularly, hardness as the cover plates. The gasket, which lies across the cement joint between two adjacent cover plates, will therefore indent the cement, which is usually softer and often plastic, due to the pressure exerted. Furthermore, capillary cracks can be observed in apparatus constructed in this manner, due to the difference in thermal expansion between cement and lining material, sometimes also to strain due to internal pressure, especially if the vessel be heated externally. These capillary cracks naturally make complete sealing impossible, especially if a rather porous cement be used.

The subject of the present invention is a process and device for the construction of tight flange joints on apparatus, pipe lines, etc., of iron, concrete, wood, and the like having linings of materials which are resistant to chemical, mechanical, and thermal influences. The disadvantages mentioned of the known types of flange joints are avoided by having a seamless jointing surface, which can preferably be grooved, to take the gasket of the flange joint of two pieces of apparatus, which guarantees a completely tight joint. This grooved jointing surface is moulded by means of a template in a suitable plastic mass which, after treatment, forms a hard, elastic not too brittle material capable of receiving the high specific load of the gasket. This plastic material is laid and moulded, for example, in recesses of the cover plates which are held and braced by cement in the flange construction.

According to the chemical, thermal or pressure conditions to be met, the following materials come into consideration for the manufacture of the cover plates: stoneware, Thermosil, clinker, porcelain, glass, carbon, cast basalt, concrete, synthetic resins, ferrosilicon, and the like, and, as cement or filling material, a selection may be made from waterglass putty, synthetic resin cement, ordinary cement, bituminous cement, or any other plastic material which sets and hardens after moulding. According to the properties of the material, the cover plates may also be united with the flange by casting, welding or soldering.

The seamless jointing surface is moulded in the plastic mass which is embedded in recesses of the cover plates themselves or between cover plates and flange. Recesses having a dovetail crosssection can be used with advantage in order to anchor the filling material in the flange construction. As the plastic masses which are used are usually somewhat porous, although they are described as technically impervious filling materials, the following means of obtaining an absolutely tight flange joint, especially where strain due to temperature or pressure comes into play, is to be advised. The shape of the jointing surface and that of the gasket shall be so selected that, in addition to the main sealing on the seamless jointing surface, a seal against leakage due to porosity of the cement is provided on the cover plates. This additional seal is especially effective when machined cover plates are used.

In accordance with the working conditions of the apparatus the flanges are lined in such a manner that coverplates and cement are under a certain compressive stress. When using brittle materials with low modulus of elasticity and in the case of strain due to increased sealing loads—which can attain very high values in the case of autoclaves—this method offers appreciable advantages in so far as the compressive stresses of the materials must first be overcome before any tensile stresses begin to act. It is recognised that the tensile strength of such materials is only a fraction of their resistance to pressure. By this initial stress the resistance to shock of the cover plate is also increased.

The process of lining the apparatus is such that the supporting structure is maintained at an elevated temperature while the cover plates (which may either be of ceramic or metallic material) are put in place. Due to the greater temperature expansion of the supporting structure the whole lining will be under a certain initial stress when cooled to room temperature. Also by employing a cement which is capable of swelling and by placing the flange joint under pressure at raised temperature an initial stress may be reached which creates appreciable compressive stresses in the flange joint, especially after the cement has hardened.

Only the combination of seamless jointing surface and initial stress in the cover plates of the flange joint make it possible to use lined apparatus for high temperatures and pressures.

When lining vessels with heat-conducting plates and cements, the use of cover plates of the same quality for the flange construction is necessary on account of thermal strains. It has also been found in particular that when using materials with high thermal conductivity coefficients, lower compressive stresses occur in the cover plates during the heating of the apparatus on account of the more rapid rise of the flange temperature. This proves to be very advantageous in the case of heat- or fire-proof linings, particularly if high working pressures are used in the apparatus. For such working conditions only the new flange joint offers a satisfactory technical solution.

The cemented joints between the cover plates of lined vessels are, in most cases, only tight against gases and liquids and are only successful in preventing a circulation of the corroding liquids in the pores of the cement joints if these pores are closed to the outside. By laying the gasket on the joint between flange and cover plate, a complete seal of the lining towards the outside is attained. For strong acids and high internal pressures this method is the only one which assures satisfactory operation.

A further step in this direction can be made by shaping the gasket so that a seal is also obtained on the surface of the supporting structure. This prevents any possible leakage through the pores of the cemented joint on which the gasket lies.

The jointing surface with its grooves can for certain conditions be directly moulded in an elastic cementing material, without the use of cover plates as a support.

The new flange joint possesses considerable advantages, especially in the case of containers of large diameter, as they are often used in modern acid plants, where it is either exceptionally difficult or absolutely impossible to machine the flanges. The jointing surface on the flange can be easily and cheaply prepared with the use of templates at the place of assembly. The same may be said of repairs, which can also be carried out at low cost.

The new method of sealing now permits the lining of containers with plates, for example, of ceramic origin, without the use of any metal. Such containers can therefore replace enamelled and rubber-lined apparatus, since the cover, also, by reason of the new invention, can be lined faultlessly and imperviously with plates by the use of the new-style flange sealing. With it, reaction vessels for the chemical industry can be developed which resist the chemical attack of all combinations of strong acids and solvents at temperatures up to their boiling point, in which cases homogeneously lead-lined, enamelled or rubber-lined apparatus no longer come in question. Reactions which are sensitive to metals can be carried out with much greater safety in containers fitted with the new metal-free flange seal.

The following example fundamentally illustrates the process and device for the construction of a tight flange joint.

Fig. 1 shows a section of a vessel 1 with cover 2, both of cast iron, which, for example, are lined with ceramic plates 3 and 4. The plates 3 and 4 are united to the supporting structure 1 and 2 by means of layers of cement 5 and 6. The flange of the vessel is constructed in such a manner that the cover plates 7 can be cemented between the rim of the flange of the vessel 1 and the plate lining 3. The end plate 4 of the cover lining 4a is held in place by the cover flange 2. In cover plate 7 and end plate 4, for example, dove tailed recesses 8 are shown which are filled with a mouldable material. By means of a template, which is moved along the machined rim of the flange, a grooved jointing surface 9, the grooves running parallel to the flange of the vessel, can be formed in the plastic mass which, after hardening or setting, forms a jointless groove 9 to take the gasket 10. By a sealing surface of this nature fitted with grooves 9, the joint 12 between two cover plates 7 or end plates 4—as is depicted in perspective view of drawing Fig. 5—is interrupted, and it is no longer possible for channels to be formed by cracks due to heat or tension which would lead to the outside of the vessel. The gasket 10 can be so that the seal is formed on the seamless jointing surface 9 and, simultaneously, on the cover plate 1.

In Fig. 2 the flange of the vessel 1, which is lined with plates 3, is protected by means of U-shaped cover plates 7 and with an intermediate layer of cement 5 and, as in Fig. 1, is fitted with a seamless jointing surface with grooves 9 in the plastic mass, which is embedded in the recess 8.

Fig. 3 shows a container 1, for example of concrete with a protective layer 11. In place of the cover plates, a mouldable material is laid between the lining 3 and the rim of the flange of vessel 1. This mouldable material is provided with a sealing surface with grooves 9 by means of a template.

Vessels which are to withstand pressure, heat and corrosive acids are best lined as shown in Fig. 4. The flange is sealed at the separating joint 5 between vessel 1 and lining 3 in order to prevent leakage through the cement joints. Since the sealing takes place on seamless jointing surface 9 and on the surface of the flange 1, absolute tightness of the flange is obtained. The recess 8, which is filled with the mouldable material to form the grooved seamless jointing surface 9, is partly anchored in the flange 1 and partly in the lining 3, which in this design takes the place of the cover plate.

The method according to Fig. 5 is suggested as the principal solution of the problem of making a tight flange joint for autoclaves and vessels which have to withstand the most severe thermal and chemical influences. Particularly where the strain is due to the simultaneous action of acid and solvents at high temperature, in which case the cement as well as the gasket material may not stand indefinitely, a twofold sealing has very great advantages. The vessel 1, which, for such purposes, is usually fitted with two layers of plates 3 and 3a, is provided with a cover plate 7 which has two recesses 8 and 8a and thus also two grooved sealing surfaces 9 and 9a. For the working conditions mentioned, the sealing surface 9 is, for example, moulded in waterglass cement, a material which is not completely tight, whereas for the sealing surface 9a a cement is used which is tight against gases and liquids but which is not completely resistant to solvents. The choice of gaskets which are laid in the grooves 9 and 9a are made under similar viewpoints. Also in the high temperature field of strong acids, such as sulphuric acid, the double sealing offers great advantages, since two types of cement may be used.

What I claim is:

1. In a tight joint construction on a flanged hollow body made of material insufficiently resistant to chemical, mechanical and thermal influences, the inside of whcih flanged body is at least partially covered by a plurality of plates made of material resistant to chemical, mechanical and thermal influences, which cover plates are jointed together, means for sealing the joints including at least one seamless ring of set plastic material over-bridging the joints of the cover plates, said ring lying within alined recesses located in the cover plates of the flange.

2. In a tight joint construction on a flanged hollow body made of material insufficiently resistant to chemical, mechanical and thermal influences, the inside of which flanged body is at least partially covered by a plurality of plates made of material resistant to chemical, mechanical and thermal influences, which cover plates are jointed together, means for sealing the joints including at least one seamless ring of set plastic material over-bridging the joints of the cover plates, said ring lying within alined recesses located partly in the cover plates of the flange and partly in the flnage portion of the hollow body.

3. In a tight joint construction on a flanged hollow body made of material insufficiently resistant to chemical, mechanical and thermal influences, the inside of which flanged body is at least partially covered by a plurality of plates made of material resistant to chemical, mechanical and thermal influences, which cover plates are jointed together, means for sealing the joints including at least one seamless ring of set plastic material over-bridging the joints of the cover plates, said ring lying within alined recesses located in the flanged portion of the hollow body.

4. In a tight joint construction on a flanged hollow body made of material insufficiently resistant to chemical, mechanical and thermal influences, the inside of which flanged body is at least partially covered by a plurality of plates made of material resistant to chemical, mechanical and thermal influences, which cover plates are jointed together, means for sealing the joints including two seamless rings of set plastic material overbridging the joints of the cover plates, one of said rings lying within alined recesses located in the cover plates of the flange, and the other of said rings lying within alined recesses partly in the cover plates of the flange and partly in the flange portion of the hollow body.

CASIMIR THEILER.